Patented July 30, 1940

2,209,754

UNITED STATES PATENT OFFICE 2,209,754

SELF-SET MAGNESIUM CARBONATE COMPOSITION AND METHOD OF EFFECTING SETTING THEREOF

Samuel A. Abrahams, San Francisco, and Rubin Lewon, Menlo Park, Calif., assignors to Plant Rubber & Asbestos Works, San Francisco, Calif., a corporation of California No Drawing. Application March 8, 1939, Serial No. 260,663

16 Claims. (Cl. 18—48)

Our invention relates to magnesium carbonate compositions, and more particularly to an improved method for effecting setting of a slurry containing magnesium carbonate prepared to possess self-setting properties and to an improved final product. This application is a continuation in part of our co-pending application, Serial No. 212,697, filed June 9, 1938.

In our assignee's co-pending application, Serial No. 2112,698, filed June 9, 1938, we have disclosed a type of method whereby such self-setting magnesium carbonate may be prepared. Briefly, such type of method comprises precipitating comparatively fine needle-like magnesium carbonate crystals in an aqueous vehicle by reaction of a magnesium compound, such as sea water bittern, with a carbonate salt, such as sodium carbonate. In this crystalline form, the magnesium carbonate possesses self-setting properties. Care is taken during the reaction to prevent total or partial destruction of such crystals after they form, which destruction would occur should the reaction be conducted at too high a temperature, resulting in loss or impairment of their self-setting properties. Excessive agitation during the reaction has been found to expedite the formation of such crystals, and is consequently employed. The magnesium carbonate crystals having most desirable self-setting properties for subsequent employment in the manufacture of insulating products, when examined under the microscope, will usually range from about twenty (20) to fifty (50) microns in length and from about two (2) to five (5) microns in thickness.

Our assignee's co-pending application, Serial No. 212,696, filed June 9, 1938, discloses another type of method whereby the described self-setting magnesium carbonate crystals may be obtained by decomposition of an aqueous solution of magnesium bicarbonate. Briefly, such decomposition is effected by excessively agitating the magnesium bicarbonate solution and simultaneously applying heat, to thus drive off carbon dioxide, which results in the precipitation of the self-setting magnesium carbonate crystals. Care is also taken during formation of the crystals to preclude total or partial destruction thereof by too high a temperature. Addition of active or caustic magnesium oxide to the magnesium bicarbonate solution, has been found to hasten the decomposition reaction.

Such self-setting magnesium carbonate crystals may be also formed by gassing with carbon dioxide-containing gas an aqueous vehicle containing a suspension of magnesium hydroxide. In commercial practice, the magnesium hydroxide suspension is generally formed by treating with water calcined magnesite (a natural occurring magnesium carbonate) or calcined dolomitic material (a natural occurring mineral composed essentially of calcium carbonate and magnesium carbonate). In such method, the precipitation of the self-setting carbonate of magnesium crystals occurs as the gassing with carbon dioxide-containing gas proceeds.

Care should be taken that the temperature of the reaction does not get too high because if it does the self-setting properties of the magnesium carbonate crystals would be impaired, if not destroyed. For best results, the reaction should also be controlled to convert substantially all of the magnesium ions in the reacting medium to the described crystalline carbonate of magnesium, as the presence of magnesium in a form other than the fine needle-like crystals impairs the setting properties of the product. As with respect to the formation of such magnesium carbonate crystals by reaction of a magnesium compound with a carbonate salt in an aqueous vehicle, and by the decomposition of a magnesium bicarbonate solution, excessive agitation will enhance the formation thereof in the gassing method.

A suitable temperature range for conducting the gassing method is between sixty-eight degrees Fahrenheit (68° F.) and one hundred four degrees Fahrenheit (104° F.), preferably at about eighty-six degrees Fahrenheit (86° F.); the quantity of water being preferably from fifteen (15) parts to as high as sixty (60) parts per part of magnesium oxide, by weight.

In the case where dolomitic material is used as a source of raw material, the inherent lightness of the final product resulting from the self-setting properties thereof, enables a slurry containing both the calcium carbonate which is insoluble and the self-setting magnesium carbonate crystals, to be set as such. In other words, the calcium carbonate need not be removed for the production of a satisfactory light weight heat insulating block, as is required in other commercial pressure molding processes where dolomitic material is the source of raw material.

From the preceding, it is seen that at some point during the preparation of a carbonate of magnesium by a reaction, in an aqueous reaction vehicle, which consists essentially of the combination of magnesium and carbonate ions, a precipitate of comparatively fine or thin needle-like crystals of magnesium carbonate is formed; and this crystalline magnesium carbonate which is a normal hydrated magnesium carbonate, believed to be the trihydrate, has self-setting properties. In this connection, it is desirable to obtain relatively small needle-like crystals because these have been found to provide greater strength in the final product than that obtainable by larger crystals. Excessive agitation will produce the desirable smaller crystals which for most desirable self-setting properties for subsequent employment in the manufacture of insulating products, will usually range from about twenty (20) to fifty (50) microns in length and from about two (2) to five (5) microns in thickness, as was previously mentioned.

If a slurry of such normal hydrated magnesium carbonate crystals is cast or poured into a form or mold, the composition will set in a quiescent state to provide a self-set final product; the setting in the mold being materially expedited by application of heat. The composition has substantially no shrinkage upon setting; and no mechanical pressure need be applied thereto, as is necessary in other methods, wherein the magnesium carbonate is usually molded under mechanical pressure in a filter mold, simultaneously with the expulsion of water therefrom through perforations in such filter mold. As a result, the density of the self-set product may be governed by the quantity of water left in the slurry which is poured into the mold, and such mold need not be perforated.

The usual types of reenforcing materials, such as asbestos or other suitable reenforcing fiber, in an amount sufficient to provide a final product which contains from ten percent. (10%) to fifteen percent. (15%) by weight of the fiber, may be intermixed with the slurry to be set; such product being generally that employed commercially for heat insulating purposes. Other chemically inactive solid bodies, such as vermiculite or diatomaceous earth, may be also mixed in the slurry. Such inert filler or reenforcing fiber may be mixed directly in the slurry after it is formed, or if desired, they may be incorporated in the reaction vehicle in which the self-setting magnesium carbonate crystals are formed.

We have found that certain conditions of alkalinity of the slurry will enable control of the setting and also permit such setting to occur more expeditiously as well as impart increased strength to the final product; and, if the setting is conducted under special controlled conditions, a superior grade product will result. Also, we have found that the slurry before being cast into a form or mold wherein it is to be set, may be preheated to cooperate in hastening the time of setting in the form. Our invention, therefore, has as its objects, among others, the provision of improvements in the product and in the manner of obtaining setting of the described self-setting magnesium carbonate crystals. Other objects of the invention will become apparent from a perusal of the following description thereof.

In general, we have found that if the slurry of the magnesium carbonate crystals to be set is not already markedly alkaline (i. e. alkaline reserve sufficient to neutralize magnesium bicarbonate generally present in the slurry and consume some of the carbon dioxide which is given off during the setting), the addition of a carbon dioxide consuming alkali thereto in a quantity sufficient to render the slurry markedly alkaline, will provide a control for the setting of the product and allow such setting to be expedited; and in addition impart added strength to the final product. To further expedite setting in the form, the slurry may be preheated prior to being cast therein. Also, we have found that the setting is best conducted in an environment wherein substantially no drying or dehydration of the setting mass can occur, so that there is very little, if any, loss in weight thereof. This helps to preclude any shrinkage which might tend to occur. Drying of the set product is effected by a separate and independent subsequent step. With respect to forms wherein a comparatively large surface area of the setting mass is exposed so that moisture can readily evaporate from such exposed area, such as open pans, the setting to accomplish the best results should be in an enclosed chamber substantially free of drafts to the outside atmosphere and which is moisture-laden to the point where the atmosphere under which the setting occurs is substantially moisture-saturated with respect to the vapor pressure of the water in the mass being set, to preclude evaporation of moisture from the setting mass. The same effect may be obtained in an open space when forms are employed which enclose substantially all of the surface area of the setting mass, such as a tube-like form in which the setting mass is exposed only at an end of the form. In this event, substantially no moisture can evaporate during the setting period, and such forms, therefore, provide the means for precluding drying or dehydration of the setting mass. Steam can be employed as the source of heat when forms of the latter type are utilized but any other suitable heat may be employed if desired.

Although all the steps of heating the slurry before it is cast into the form, utilizing a markedly alkaline slurry, and conducting the setting in an environment wherein drying of the setting mass is precluded, are employed, the step of utilizing a markedly alkaline slurry may be omitted, and still produce a satisfactory product. Also, the step of setting the slurry without substantial dehydration in a substantially nondrying atmosphere, may be omitted, and still produce a good product. The step of preheating the slurry prior to pouring it into the forms is desirable because it enables the setting to be conducted in a shorter time, thereby making for economy of manufacture. However, such step may be omitted without effecting the quality of the final product. For the production of a superior product, the setting should be conducted under the described conditions wherein substantially no drying of the setting mass can occur and the slurry is rendered markedly alkaline. In addition to effecting the quality of the final product, the markedly alkaline slurry, as previously pointed out, permits expedition of the setting. Therefore, the combination of this step and the preheating step are important in obtaining a fast set.

Our improved method of setting the slurry containing the described self-setting needle-like magnesium carbonate crystals will now be described in greater detail. Such magnesium carbonate is a normal hydrated magnesium carbonate, believed to be the trihydrate, which sets by conversion to a basic magnesium carbonate, the conversion being enhanced by application of heat. Heretofore, it was deemed necessary to avoid application of heat to the magnesium carbonate crystals during the period between the termination of the reaction by which they are formed and prior to the setting thereof in the forms or molds. We have now found that heat may be applied during this period without weakening the final set of the product in the molds, provided the temperature and time are below the critical point at which the normal carbonate commences to undergo conversion to a basic carbonate. If the preheating temperature is too high, such conversion will occur in a relatively short time, while if the temperature is low but applied over a relatively long time, the conversion will also occur. The skilled operator can readily ascertain when such conversion commences because when it does the slurry starts to thicken or gel. Any preheating of the slurry before it is poured into the forms should, therefore, be below the point at which incipient conversion or gelling occurs.

Preheating of the slurry after it is formed and before being poured into the molds is desirable for commerical reasons because it enables the setting time to be materially shortened in the molds, thus resulting in economy of manufacture. The preheating should be conducted to bring all of the slurry to a substantially uniform temperature as quickly as possible before pouring into the molds. This can be best accomplished by heating relatively small batches of the slurry, and simultaneously stirring or mixing such batches to provide the uniform incorporation of the heat. The preheating may be conducted in open heated vessels if so desired; or by conveying the slurry through heated screw conveyors which serve to mix the slurry as well as convey it. Although conversion of the slurry to a basic magnesium carbonate will occur at widely varying temperatures, depending on the character of the self-settable normal magnesium carbonate crystals, we have found that in most cases such conversion occurs readily at a temperature of about one hundred thirty degrees Fahrenheit (130° F.) to one hundred seventy degrees Fahrenheit (170° F.). It is generally desirable to employ masses being preheated which take about ten (10) to fifteen (15) minutes to bring all of the slurry up to the desired preheating temperature. It is undesirable to have conversion from the self-settable normal hydrated magnesium carbonate crystals to a basic magnesium carbonate, occur during the preheating because the entire setting should occur in the molds to provide a final product of maximum strength. As was previously pointed out, the preheating step may be omitted, if so desired.

To hasten and also control the setting of the slurry containing such crystals whether it is or is not preheated, and at the same time increase the strength of the final product, we preferably render it markedly alkaline, if it is not already markedly alkaline, by adding thereto either prior or after preheating if employed, or to the vehicle from which it is formed, an excess of an alkali having the property of consuming carbon dioxide which may be by absorption, adsorption or reaction, such as preferably caustic or active magnesium oxide, i. e., magnesium oxide which is not dead burnt, borax, or an alkali metal hydroxide such as sodium hydroxide, or any suitable mixtures thereof. An alkali, such as lime, may also be employed, but is not desirable because it would adulterate the final product to too great an extent. The carbon dioxide-consuming alkali which is added to the slurry prior to the setting is believed to enter into a reaction with other substances existing in the setting slurry. For any given setting conditions, the length of time of the set may be regulated by the quantity of the carbon dioxide-consuming alkali which may be added to the slurry; the more alkali added within practical limits, the faster being the set permitted. In this connection, the carbon dioxide-consuming alkali also permits faster setting than would otherwise be permitted with respect to any given slurry which does not have the carbon dioxide-consuming alkali therein because it allows the setting to be conducted at higher temperatures, to thereby hasten the conversion to a basic carbonate.

If only magnesium oxide is added, usually an amount thereof ranging from one percent. (1%) to ten percent. (10%) by weight of magnesium carbonate in the slurry will suffice. Borax, being a stronger alkali, is added in an amount ranging from one percent. (1%) to two percent. (2%) by weight of magnesium carbonate. An alkali metal hydroxide, such as sodium hydroxide, being still stronger, is employed in an amount ranging from one-tenth of one percent. (0.1%) to one percent. (1%) by weight of magnesium carbonate in the slurry. Magnesium oxide has the advantage of not adulterating the product at all, and, therefore, provides for greatest added strength. The stronger alkalies, such as borax and sodium hydroxide, however, permit faster setting. Therefore, a mixture of magnesium oxide and borax or an alkali metal hydroxide, produces ideal results. Such mixture may contain these substances in any desirable proportions.

The upper limit of the amount of alkali which should be added is not particularly critical, as the maximum quantity may be determined at the time by one skilled in the art, in accordance with the conditions. It is only important that the slurry be made markedly alkaline, that is, sufficiently alkaline to neutralize any magnesium bicarbonate present, which has the unfortunate property of inhibiting the set and is consequently undesirable, and provide a reserve to consume some of the carbon dioxide which is evolved during setting. In the setting operation, the slurry is cast or poured directly into imperforate forms or molds which are heated for a length of time and at a temperature sufficient to set the slurry or sludge to a firm cake. Agitation of the self-setting magnesium carbonate crystals in the mold is avoided because such agitation will impair the setting of the product. Hence, the setting in the mold is accomplished with the crystals in a quiescent state. As was previously related, the composition sets with substantially no shrinkage and no pressure need be applied to it to accomplish the setting. As a result, the density of the final product is governed by the quantity of water left in the slurry which is poured into the mold. It is to be understood that the self-settable normal hydrated magnesium carbonate crystalline precipitate is not allowed to set in the reaction vehicle and that such reaction vehicle usually contains an excess of water, a desired amount of which is usually removed, in any suitable way such as by decantation or filtration, to determine the density of the final product. More water than desired is usually removed when the precipitate is separated from the reaction vehicle, for example for the purpose of washing it, but additional water may be added afterwards to provide a final product of the desired density.

During the setting, we have found that carbon dioxide gas is given off; and microscopic observation of the set product shows that the magnesium carbonate which was originally all comparatively thin or fine needle-like crystals now consists essentially of a new crystal form. Some of the original needle-like crystals may remain, but a new, very small crystal appears. Such new crystal tends to cluster into grape-like groups, or to adhere to the surface of the needle-like crystals. This probably accounts for the great strength of the final product which breaks with a clean fracture, in contradistinction to the product of the prior processes wherein pressure molding is employed, which mushes upon being broken, thus indicating that the product of our invention is bonded by the interlacing of the crystals.

Because of the evolution of the carbon dioxide gas and the formation of the new crystals, a reaction occurs in which the carbonate of magnesium is converted into a light basic magnesium carbonate. The carbon dioxide-consuming alkali which is preferably added to the slurry prior to the setting operation, allows hastening and control of the setting which is preferably conducted in an enclosed chamber when the molds are of such character as to expose a relatively large surface area of the setting mass, such as open pans, not only because the setting can occur faster when the slurry is made markedly alkaline, but also because the consumption of some of the carbon dioxide reduces the carbon dioxide pressure in such setting mass, and thus by the principle of the law of mass action, causes the reaction to proceed faster toward the side of the set product. Also, such alkali since it consumes carbon dioxide, controls the rate of evolution thereof and precludes formation of fissures in the interior of the setting product, which might otherwise result from too rapid an evolution of the carbon dioxide, with consequent weakening of the final product.

Although no pressure is required to compact or mold the material, since the material sets in a quiescent state independent of pressure, pressure molding may be employed and still produce a superior product, or a special dense product for certain purposes. However, such pressure molding is preferably omitted inasmuch as it would increase the density of the final product, which is undesirable where the product is to be employed for heat insulating purposes. Inasmuch as pressure molding has heretofore been necessary because the magnesium carbonate produced by other methods does not have self-setting properties, and because pressure may be applied to the self-settable magnesium carbonate of our invention but is not necessary, the expression "independent of pressure" is employed hereinafter to describe that the magnesium carbonate of our invention has self-setting properties not conditioned on pressure.

When preheating of the slurry is not employed and the molds are of such character as to expose a relatively large surface area of the setting mass, the temperature applied to the molds during the setting should not be too high or applied too rapidly, because, although the product will set, the evolution of gas may be so rapid as to leave the final product with gas holes. Neither should the temperature be too low, because then the setting is, generally speaking, too slow for practical purposes. A suitable temperature range under atmospheric pressure is substantially from one hundred forty degrees Fahrenheit (140° F.) to one hundred ninety-five degrees Fahrenheit (195° F.). At this temperature range, the setting to a hard cake in molds which expose a relatively large surface area of the product will usually occur in from one-half to three (½ to 3) hours, the time varying, of course, with the temperature actually applied, and also with the chemical and physical character of the composition, as well as the thickness of the mass. If the slurry is preheated, and also markedly alkaline, the setting in molds which expose a relatively large surface area of the product, can be accomplished in about three to fifteen (3 to 15) minutes at a lower temperature of about one hundred thirty degrees Fahrenheit (130° F.) to one hundred seventy degrees Fahrenheit (170° F.)

For best results, it is important that the setting be conducted so that substantially no drying or dehydration of the composition occurs during the setting thereof, as this minimizes shrinkage should the setting product have any tendency to shrink. For this reason, we effect the setting in our improved method when the product is cast into molds which expose a relatively large surface area of the product, by placing the slurry-filled molds in an enclosure or chamber maintained at the desired temperature by live moist steam introduced therein under pressure. Furthermore, it is important that the enclosure in which the setting is conducted be free of any substantial drafts to the outside atmosphere because drafts might cause carrying of moisture from the product as it sets, and this might cause undesirable drying which might result in shrinkage. By employing live steam as the heating medium for effecting the setting in the molds, the region or atmosphere in which the setting occurs can be made moisture-saturated or oversaturated with respect to the vapor pressure of the water in the setting material, to thereby minimize evaporation of moisture therefrom and avoid shrinkage. Under the prescribed setting conditions, the slurry after it has set in the mold and before it is dried by a subsequent drying step to be described, will weigh substantially the same as it did when first cast into the mold.

Instead of live steam as a source of heat, the same effect may be obtained by using an external source of heat to heat the chamber in which the setting is conducted, and by introducing a spray or other source of water into the chamber to render the atmosphere therein moisture-laden. However, steam is preferred because it penetrates the setting mass to thereby replace more readily any moisture which might tend to be driven off because of the heat. If molds are employed which substantially completely jacket the slurry, such as a tube-like mold wherein the slurry is only exposed at an end of the mold, then such type of mold serves by itself to preclude substantial evaporation of moisture during the setting, and causes the setting to occur under non-drying conditions. Although steam heat may be employed for heating such form or mold, it is not necessary, as any other suitable kind of heat may be utilized instead. Furthermore, this type of mold, particularly if the slurry is preheated and contains the carbon dioxide-consuming alkali, allows the heat to be applied directly over a large area of the slurry, permitting an extremely fast set.

After having set in molds, the blocks or slabs which are formed are self-supporting before they are dry and while containing substantially the same amount of moisture as in the slurry before it has set. The blocks or slabs formed in other commercial processes where pressure molding is necessary are not self-supporting, and consequently have to be supported in frames after they are removed from the molds, so that they will not break during handling prior to drying thereof.

Upon removal of the slabs or blocks from the molds after setting thereof, they are next dried in the usual manner heretofore employed for drying the mechanically molded product. Such drying is accomplished, usually, in conventional drying ovens at a temperature ranging from one hundred fifty-five degrees Fahrenheit (155° F.) to three hundred ninety-five degrees Fahrenheit (395° F.), to remove all uncombined or free water not existing as water of crystallization. Depending on the temperature and the draft, it will take from twenty-four to seventy-two (24 to 72) hours for the drying. The drying, if desired, may be air drying, but oven drying is preferred because it is faster. Should the material tend to stick to the molds upon removal therefrom, the molds may be first greased with any suitable substance, such as petroleum grease.

Even though there is substantially no shrinkage of the material in the molds, it may be desirable to mill or trim the surfaces of the dried product so as to provide an attractive product not marred with surface imperfections. This is particularly true with respect to the type of molds, such as an open pan, wherein a relatively large surface area of the slurry is uncovered or exposed, as the exposed area tends to leave a surface which is not smooth. Not over ten percent. (10%) of the product need be removed by such milling when molds which expose a relatively large area of the slurry are employed, whereas with products produced by other methods wherein molding under pressure is required, the amount of product removed by milling runs from thirty percent. (30%) to forty percent. (40%). The milled-off material is not entirely waste material because it may be used for making magnesia insulating cement. However, it has less value as a cement, and therefore results in an economic loss. Hence, because of the lesser amount of material which need be trimmed from the block or slab of our invention when molds which expose a relatively large area of the slurry are employed, a further economy results. Because the product of our invention sets in a quiescent state substantially without shrinkage, the molds may be made of special shapes so as to form correspondingly shaped insulating fittings.

Standard commercial products of magnesium carbonate insulating blocks produced by former pressure molding methods contain about eighty-five percent (85%) by weight of basic magnesium carbonate as a bonding agent and about fifteen percent. (15%) by weight of asbestos fiber to reenforce the product. Under present standards, such blocks weigh from sixteen to eighteen pounds (16 to 18 lbs.) per cubic foot; the specific gravity, therefore, ranging from twenty-five one-hundredths (.25) to twenty-eight one-hundredths (.28). By adjustment of the water content of the slurry prior to casting it into the mold, the similar product of our invention containing the same percentages of basic magnesium carbonate and asbestos fiber can be made to weigh as low as nine pounds (9 lbs.) per cubic foot, and will average from ten to twelve pounds (10 to 12 lbs.) per cubic foot; the specific gravity, therefore, ranging from fourteen one-hundredths (.14) to nineteen one-hundredths (.19). The product of our invention will, thus, average from thirty-five percent. (35%) to forty-five percent. (45%) lighter than the corresponding product produced by former methods; and even though lighter, it is much stronger. This comparison between eighty-five percent. (85%) magnesium carbonate blocks of our invention and those heretofore produced holds true for any given specification of materials and percentages of magnesium carbonate in the respective blocks. Because of the lightness of the product of our invention, considerable saving in freight charges obtains. Also, due to the low density of our product, it has a lower heat conductivity coefficient than that of products produced by former methods. The heat conductivity coefficient of the product of our invention weighing about ten to twelve pounds (10 to 12 lbs.) per cubic foot will run about twenty percent. (20%) to thirty percent. (30%) lower than the product produced by former methods and weighing about sixteen to eighteen pounds (16 to 18 lbs.) per cubic foot.

Although the product of our invention is lighter, it is much stronger than heretofore produced products. Weight for weight, it is fifty percent (50%) to one hundred percent. (100%) stronger; while a block of our invention, for example an eighty-five percent (85%) magnesium carbonate block weighing eleven pounds (11 lbs.) per cubic foot, will be as strong or even stronger than the corresponding block produced by former methods and averaging sixteen to eighteen pounds (16 to 18 lbs.) per cubic foot.

As was previously related, where dolomitic material is the source of raw material, the calcium carbonate may be left in the slurry containing the self-setting magnesium carbonate crystals, subsequently treated by our preferred method to effect setting thereof, and still produce a satisfactory light-weight block adapted for heat insulating purposes. In this connection, the dolomitic product resulting from the method of our invention and containing the same percentage of asbestos fiber as occurs in the standard commercial magnesium heat-insulating blocks produced by former pressure molding methods, and in which calcium carbonate is not eliminated, can be made to weigh as low as twelve to sixteen pounds (12 to 16 lbs.) per cubic foot (the specific gravity, hence, ranging from about one hundred ninety-two one-thousandths (.192) to two hundred fifty-six one-thousandths (.256)). In addition to lightness the dolomitic product possesses greater strength and has higher insulating efficiency than the product produced by other commercial methods involving pressure molding, even though, in such other methods, the calcium compounds are eliminated from the source of dolomitic material. For example, a block formed by the method of our invention, weighing about fourteen pounds (14 lbs.) per cubic foot, is stronger than a sixteen pound (16 lb.) per cubic foot block produced by other commercial methods involving mechanical pressure and in which calcium carbonate is eliminated from the dolomitic material. Yet such block resulting from our method will have about twenty-five percent. (25%) greater insulating efficiency.

The product of our invention because of its light weight, is highly porous, i. e., cellular in structure, which is one of the factors enabling it to have a high heat insulating efficiency. Furthermore, although the product is shaped, it is not stony or rock-like in character as are artificial stones or natural rocks, but is chalk-like in character. In other words, compared to an artificial stone or natural rock, it is relatively soft or crushable; the material being readily rubbed off from the surface thereof. However, insofar as magnesia insulation is concerned, the final dried product of our invention is relatively hard and firm or rigid, with sufficient strength and cohesive bonding power to provide a modulus of rupture (flexure strength) enabling such product to be entirely self-supporting in slabs as thin as one (1) inch and as long as three (3) feet. Such strength is necessary for allowing the material to be handled and applied. Not only is the final dried product self-supporting but, as previously explained, the set product prior to drying is also self-supporting.

The results of our invention are obtainable, irrespective of whether or not the composition to be set consists essentially of the self-setting, normal hydrated magnesium carbonate crystals alone or of such magnesium carbonate crystals intermixed with other materials. Therefore, in the appended claims, the expression "magnesium carbonate composition" includes compositions, such as the dolomitic composition described, which contain materials in addition to magnesium carbonate.

We claim:

1. In the method of producing a self-set magnesium carbonate composition from a slurry containing normal magnesium carbonate crystals having self-setting properties independent of application of pressure, said composition being capable of use as a heat insulating material, the step of enhancing setting of such slurry by adding an alkali thereto to consume carbon dioxide which is evolved during the setting.

2. In the method of producing a self-set magnesium carbonate composition from a slurry containing normal magnesium carbonate crystals having self-setting properties independent of application of pressure, said composition being capable of use as a heat insulating material, the step of enhancing setting of such slurry by adding magnesium oxide thereto to consume carbon dioxide which is evolved during the setting.

3. In the method of producing a self-set magnesium carbonate composition from a slurry containing precipitated normal magnesium carbonate crystals having self-setting properties independent of application of pressure, said composition being capable of use as a heat insulating material, the step of incorporating borax in such slurry.

4. In the method of producing a self-set magnesium carbonate composition from a slurry containing precipitated normal magnesium carbonate crystals having self-setting properties independent of application of pressure, said composition being capable of use as a heat insulating material, the step of incorporating an alkali metal hydroxide in such slurry.

5. A molded light weight cellular chalk-like but substantially rigid and self-supporting basic magnesium carbonate composition capable of use as a heat insulating material and self-set substantially without shrinkage independent of application of pressure from normal magnesium carbonate crystals having self-setting properties, said composition being strengthened by the product resulting from the addition thereto of a carbon dioxide-consuming alkali.

6. A molded light weight cellular chalk-like but substantially rigid and self-supporting basic magnesium carbonate composition capable of use as a heat insulating material and self-set substantially without shrinkage independent of application of pressure from normal magnesium carbonate crystals having self-setting properties, said composition being strengthened by the product resulting from the addition thereto of the magnesium oxide.

7. A molded light weight cellular chalk-like but substantially rigid and self-supporting basic magnesium carbonate composition capable of use as a heat insulating material and self-set substantially without shrinkage independent of application of pressure from normal magnesium carbonate crystals having self-setting properties, said composition being strengthened by the product resulting from the addition thereto of borax.

8. A molded light weight cellular chalk-like but substantially rigid and self-supporting basic magnesium carbonate composition capable of use as a heat insulating material and self-set substantially without shrinkage independent of application of pressure from normal magnesium carbonate crystals having self-setting properties, said composition being strengthened by the product resulting from the addition thereto of an alkali metal hydroxide.

9. A magnesium carbonate composition capable for the preparation of heat insulating material and having self-setting properties independent of application of pressure comprising a self-settable slurry containing needle-like crystals of normal magnesium carbonate having self-setting properties, said slurry also having sufficient alkali added thereto to neutralize any magnesium bicarbonate which may occur therein and consume carbon dioxide which is evolved during setting of the slurry.

10. The method of producing a self-set magnesium carbonate composition which comprises forming in a reaction vehicle a precipitate of normal magnesium carbonate in the form of needle-like crystals having self-setting properties, without allowing setting of such precipitate in the reaction vehicle removing from the reaction vehicle a slurry containing such precipitate, incorporating a carbon dioxide-consuming alkali in said precipitate to allow the subsequent setting thereof to be expedited, effecting the setting by applying heat to the slurry, and drying the resultant product.

11. The method of producing a self-set molded magnesium carbonate composition which comprises forming in a reaction vehicle a precipitate of normal magnesium carbonate in the form of needle-like crystals having self-setting properties, without allowing setting of such precipitate in the reaction vehicle removing from the reaction vehicle a slurry containing such precipitate, incorporating a carbon dioxide-consuming alkali to allow the subsequent setting to be expedited, either before or after the incorporation of said carbon dioxide-consuming alkali preheating said slurry to cooperate in expediting the setting, casting the preheated slurry into a form adapted to shape said composition, effecting the setting by applying heat to the slurry in the form, and drying the resultant product.

12. In the method of setting a magnesium carbonate composition by application of heat to a slurry containing normal magnesium carbonate in the form of needle-like crystals having self-setting properties; the step of expediting the setting by preheating the slurry prior to effecting setting thereof.

13. In the method of producing a self-set molded magnesium carbonate composition by application of heat to a slurry in a form adapted to shape the composition and which contains normal magnesium carbonate in the form of needle-like crystals having self-setting properties; the steps of expediting the setting by preheating the slurry prior to casting it into said form, and either before or after such preheating incorporating a carbon dioxide-consuming alkali.

14. A basic magnesium carbonate composition self-set independent of application of pressure by conversion from normal magnesium carbonate crystals having self-setting properties, said composition being strengthened by the product resulting from the addition thereto of a carbon dioxide-consuming alkali.

15. A molded light weight cellular chalk-like but substantially rigid and self-supporting basic magnesium carbonate heat insulating composition reenforced by asbestos fiber, self-set independent of application of pressure without shrinkage by conversion from normal magnesium carbonate crystals having self-setting properties; said composition being characterized by the absence of fissures resulting from the incorporation therein of a carbon dioxide-consuming alkali.

16. The method of producing a self-set basic magnesium carbonate composition capable of use as a heat insulating material which comprises forming in an aqueous reaction vehicle a precipitate of normal magnesium carbonate in the form of needle-like crystals having self-setting properties, without allowing setting of such precipitate in the reaction vehicle removing from the reaction vehicle a slurry containing such precipitate, adding sufficient alkali to neutralize any magnesium bicarbonate which may occur and to consume carbon dioxide which is evolved during the setting, either before or after the addition of said alkali preheating the slurry to cooperate in expediting the setting, casting the preheated slurry into a form adapted to shape said composition, effecting the setting by applying heat to the slurry in the form while simultaneously precluding evaporation of substantial amounts of moisture from the setting slurry to minimize shrinkage during the setting, and drying the resultant product.

SAMUEL A. ABRAHAMS.
RUBIN LEWON.

CERTIFICATE OF CORRECTION.

Patent No. 2,209,754.    July 30, 1940.

SAMUEL A. ABRAHAMS, ET AL.

It is hereby certified that error appears in the printed specification of the above numbered patent requiring correction as follows: Page 1, first column, line 10, for "2112,698" read --212,698--; and that the said Letters Patent should be read with this correction therein that the same may conform to the record of the case in the Patent Office.

Signed and sealed this 17th day of September, A. D. 1940.

(Seal)

Henry Van Arsdale,
Acting Commissioner of Patents.

CERTIFICATE OF CORRECTION.

Patent No. 2,209,754. July 30, 1940.

SAMUEL A. ABRAHAMS, ET AL.

It is hereby certified that error appears in the printed specification of the above numbered patent requiring correction as follows: Page 1, first column, line 10, for "2112,698" read --212,698--; and that the said Letters Patent should be read with this correction therein that the same may conform to the record of the case in the Patent Office.

Signed and sealed this 17th day of September, A. D. 1940.

(Seal)

Henry Van Arsdale,
Acting Commissioner of Patents.